(12) United States Patent
Ciecko

(10) Patent No.: US 11,068,556 B2
(45) Date of Patent: Jul. 20, 2021

(54) DELIVERING INFORMATION ABOUT AN IMAGE CORRESPONDING TO AN OBJECT AT A PARTICULAR LOCATION

(71) Applicant: Brendan Ciecko, Boston, MA (US)

(72) Inventor: Brendan Ciecko, Boston, MA (US)

(73) Assignee: Cuseum, Boston, MA (US)

( * ) Notice: Subject to any disclaimer, the term of this patent is extended or adjusted under 35 U.S.C. 154(b) by 239 days.

(21) Appl. No.: 15/909,693

(22) Filed: Mar. 1, 2018

(65) Prior Publication Data

US 2019/0272336 A1 Sep. 5, 2019

(51) Int. Cl.
*G06F 16/9537* (2019.01)
*H04W 4/02* (2018.01)
*G06K 9/62* (2006.01)
*G06F 16/58* (2019.01)
*G06F 16/583* (2019.01)

(52) U.S. Cl.
CPC .......... *G06F 16/9537* (2019.01); *G06F 16/58* (2019.01); *G06F 16/5854* (2019.01); *G06K 9/6268* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 10,157,449 B1* | 12/2018 | Chang | G06F 16/50 |
| 2005/0273725 A1* | 12/2005 | Russon | G06F 16/58 |
| | | | 715/780 |
| 2006/0251292 A1* | 11/2006 | Gokturk | G06K 9/00375 |
| | | | 382/103 |
| 2008/0133526 A1* | 6/2008 | Haitani | G06F 16/58 |
| 2011/0209221 A1* | 8/2011 | Hanson | H04N 21/4122 |
| | | | 726/26 |
| 2017/0161382 A1* | 6/2017 | Ouimet | G11B 27/34 |

\* cited by examiner

*Primary Examiner* — Alford W Kindred
*Assistant Examiner* — Cao D Vuong
(74) *Attorney, Agent, or Firm* — Robert Schuler

(57) ABSTRACT

An information delivery system has a computational device connected over a network with a server and associated storage device. The computational device is configured with functionality that generates a message requesting information relating to a particular geolocation that is stored in association with the server. The server identifies one or more files corresponding to the location information in the message and delivers them to the computational device, which compares information in the files with a visual image relating to an object selected by a computational device user and with an object type relating to the visual image, and displays information in a file if the visual image selected by the user matches visual image information in the file.

6 Claims, 6 Drawing Sheets

DELIVERING INFORMATION ABOUT AN IMAGE CORRESPONDING TO AN OBJECT AT A PARTICULAR LOCATION

1. FIELD OF THE INVENTION

The present disclosure relates to the delivery of information about an object that is proximate to a known location based upon an image and geolocation of the object.

2. BACKGROUND

With the vast quantity of information that is now stored on network devices, and which is available for consumption over networks such as the Internet, information retrieval systems have been developed to facilitate the rapid and intuitive retrieval of this information. Requests or queries for information stored on these networks can be entered into an information retrieval system, and the system can operate to identify and to return a listing of information or network pages that most closely match the query. Different types of information retrieval systems have been developed to accommodate the identification and delivery of different types of information in different ways. Systems have been developed which operate to retrieve information based on key words or phrases in a search request or query, or to retrieve information that is germane to a current location of a mobile device based on geolocation or proximity information provided by the mobile device. Another type of system for retrieving network information is a context-based image retrieval (CBIR) system, which operates to retrieve information based upon requests that include image information.

3. BRIEF DESCRIPTION OF THE DRAWINGS

4. DETAILED DESCRIPTION

Figure 1:
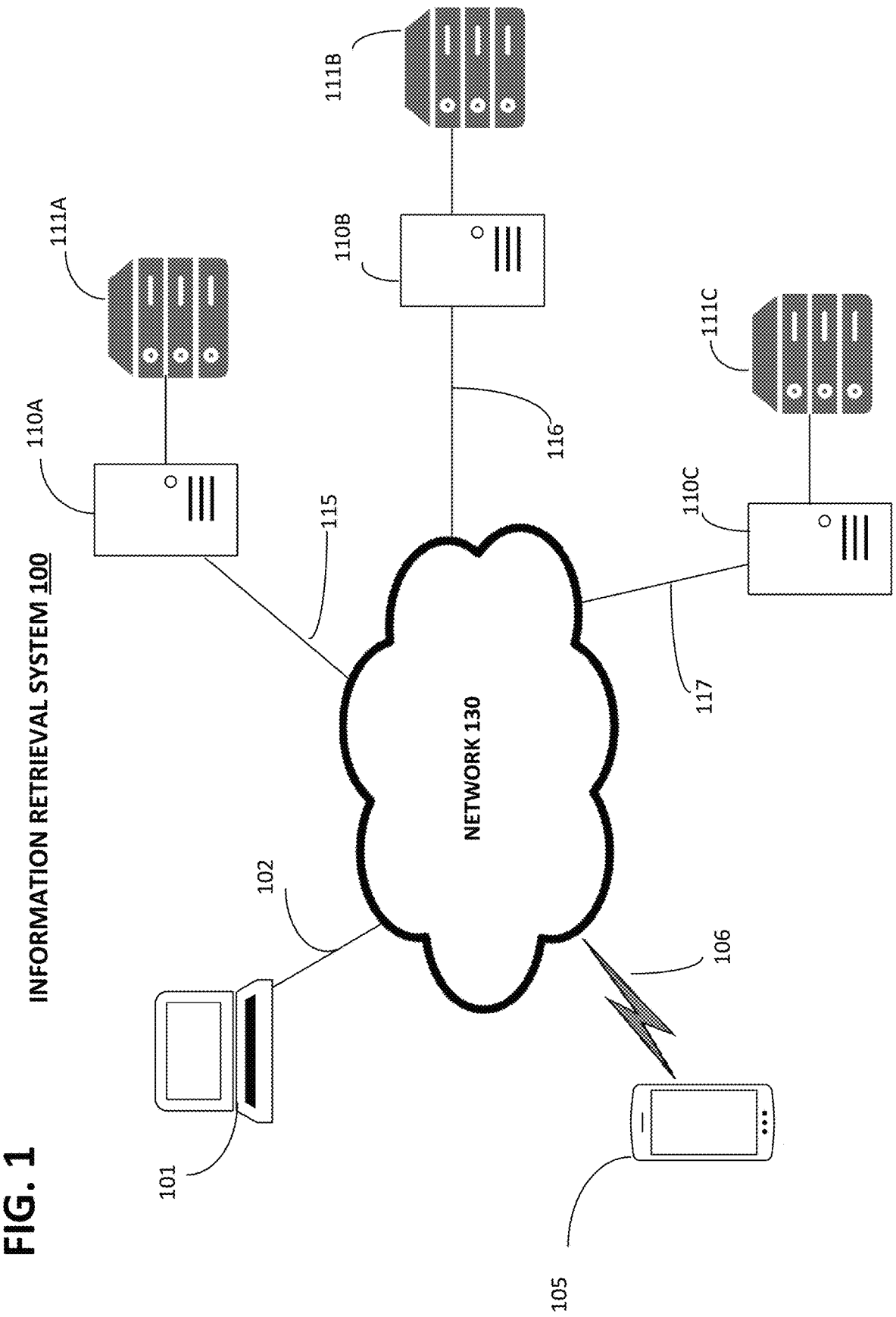
FIG. 1 is a diagram showing elements comprising an information retrieval system connected to a public network.

The degree to which an information retrieval system is useful often depends on the ability of the system to easily, quickly and accurately retrieve information of interest to a requestor, without returning information that is of marginal or no interest. To this end, information retrieval systems have been developed that rank or score the information that is identified during a search, and this information can be presented in a search engine results page (SERP) in rank order with the closest match first. A typical search can return a large number of results, which can take a long time to review and identify information that is interest to the individual requesting the information. Furthermore, queries based on image information can be particularly lengthy and imprecise, as only a limited amount of information can reasonable be stored about any particular image (fingerprint information for example), and so, finding a match to an image of interest in a query can take a relatively long time and return a large number of items/pages for display on a SERP.

In lieu of the forgoing, it would be advantageous if the operation of an information retrieval system is restricted such that it can only identify and deliver information that relates to a particular object located at a particular geographic position. I have designed an image and location-based information retrieval system that can identify and only deliver information that specifically relates to a particular object, such as an object of art, a person, a place or anything that is identifiable based upon visual image and geographic position information associated with the object. This retrieval system can access special location defined files maintained in a network that can have geographic location information about the object, classification information about the type of the object, visual image information that relates to the object and descriptive information about the object.

According to one embodiment, the retrieval system operates, under user control, to generate a search query having a current location of a communication device or location information entered by a user of the communication device and having information relating to a type of the object or object classification. The retrieval system can process the search query and return information that is limited to the type of the object at the location in the search query. The information retrieved by the system can be in the form of a location defined file that has visual image information relating to the object that is the subject of the search query. The retrieval system can then compare the visual image information in the retrieved location defined file with visual image information residing on the communication device which relates to the object of interest to the communication device user, and if the visual information matches, or is similar, the retrieval system can display the location defined file on the communication device to be viewed by the device user. In this manner, only information of particular interest to the device user is displayed for viewing, and the information retrieval process is accelerated.

According to another embodiment, the retrieval system operates to generate a search query having a current location of the user, or a location of the object enter by the user, having an object type information, and having visual image information relating to the object of interest. The retrieval system processes the search query to identify location defined files maintained at one or more locations on a network device, it examines the identified files looking for a match between the object type information in the search query and the object type information in the location defined files, it then matches the visual image information in the search query with the visual image information in the location defined files, and only delivers information in a location defined file that meets all the criteria included in the search query.

Alternatively, more than one search query can be generated for processing by the retrieval system. For instance, a first query can be generated that only has location information, and the retrieval system can use the location information to identify a set of location defined files. Then a second message can be generated having the object type information, or have the object type and visual image information, which the system can use to compare against the set of location defined files already identified. As will be described later, depending upon the capabilities of a user communication device, and depending upon how the retrieval system is configured, the process of identifying location defined files (and information in the files) for display can occur in a number of different network locations. An information retrieval system, such as the one described above, operates to only deliver information about an object that is of interest to the user, thereby saving the user a significant amount of time sifting through information that is not of interest or that has no relationship to the object of interest to the user. The special location defined files can be maintained in any type of mass storage device associated with a computational device that is connected to and accessible over the network.

This information retrieval system does not have to search through all visual image information relating to objects available on a network looking for a match to the visual image information in the query, but rather only searches for files having location tags that correspond to the location of an object relating to the image of interest, and then searches through these location defined files looking for a match to the image type in the query, and alternatively to the visual image information also, and only delivers information about the object corresponding to the object type, or to the object type and visual image information in the query. In this regard, FIG. 1 shows such an information retrieval system 100, elements of which can all be connected to a public network 130 such as the Internet, or connected to some combination of public and private networks. As shown in FIG. 1, the system 100 has two communication devices 101 and 105, each of which are connected to the network 130 by wired or wireless links 102 and 106 respectively. The device 101 can be a stationary, or semi-stationary computational device such as a desk-top or lap-top computer, and the device 105 can be a mobile communication device, such as a smart phone or similar device. FIG. 1 also shows computational devices 110A, 110B, and 110C being connected, via links 115, 116 and 117 respectively, to the network 130 with associated storage means 111A, 111B, and 111C. The computational devices can be network servers or any type of computational device able to support the associated storage means, and the storage means can be physical or virtual disk storage, volatile or non-volatile semi-conductor memory, or any type of mass storage that can be addressed by the computational devices. Some or all of the storage means can be separate from the computational devices 110A-110C, or it can be tightly integrated in the servers. A detailed description of the functional elements comprising the computational devices, and the associated mass storage means will be included later.

Generally, the communication devices 101 and 105 can be configured with functionality that operates to capture image information (i.e., network search engine functionality), from the environment proximate to the devices or to receive image information via the search engine and stored on the communication device, to classify the image information as an object type (i.e., a work of art such as a picture type object, a sculpture type object, a tapestry type object, an image of a person type object, etc.), and which operates to receive geographic position information relating to the image of an object of interest to the device user. The communication devices can also operate to pass this image information, object type information, and geographic position information to an information retrieval function or application, running on the communication devices, which operates in conjunction with a search engine to generate a search query that it uses to retrieve information about the image stored on the network, and that is located at the geographic position included in the query, that is of the same object type as in the query, and that is compared to be the same or similar image as the one in the query.

With continued reference to FIG. 1, the computational devices 110, hereinafter referred to as network servers 110, generally operate to receive a search query from the communication devices 101 and 105, and to use the information in the query to identify information maintained in the associated storage means, which can be very large databases maintained by any organization that provides client network search engine functionality implemented on the communication devices 101 and 105. The network servers also operate to return the information, identified as the result of the network service processing the search query, to the search engine functionality running on the communication devices. The communications device 105 will now be described below with reference to FIG. 2.

Figure 2:
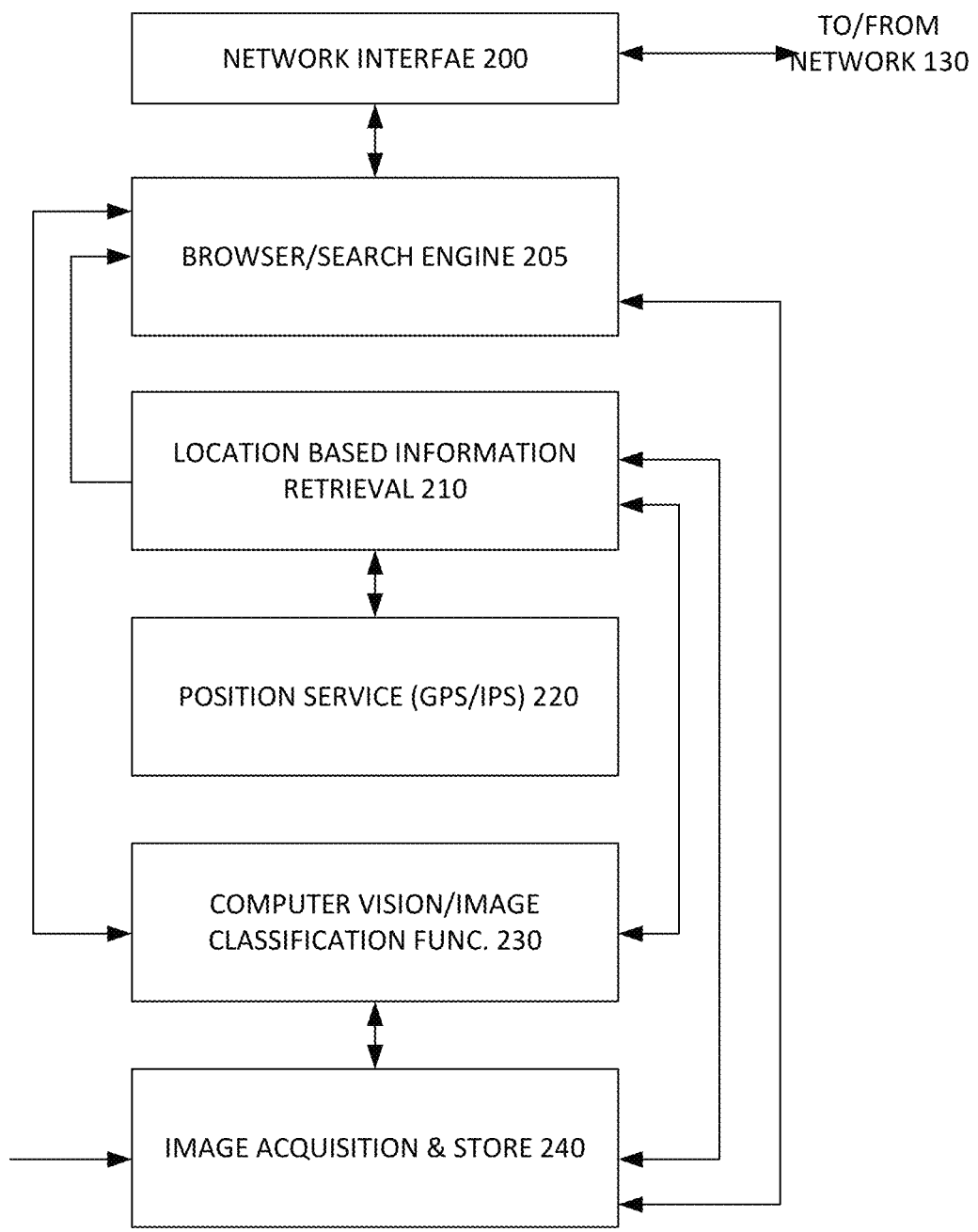
FIG. 2 is a diagram showing functional blocks comprising a mobile or non-mobile communication device connected to the public network having content retrieval functionality.

While the communication device 105 is illustrated in FIG. 1 as a mobile device, other types of communication devices can be configured with the same or similar functionality as that shown in FIG. 2. Tablet computers, laptop or desktop, or any type of communication device capable of connecting to a network can be configured to have similar functionality. The communication device 105 in FIG. 2 is configured to have a network browser or search engine 205 and a network interface in block 200, a location-based information retrieval functionality 210, geographic location service functionality 220, computer vision and image identification and classification functionality 230, and image acquisition and storage functionality 240.

The browser or search engine can be any one of a number of commercially available applications running as a client on the communication device that operate to accept search terms from a device user, to generate search requests or queries that are transmitted over the network interface to a service provider associated with the search engine application, and then returns or delivers search results to the application running on the user device for display in a SERP. The location-based information retrieval function 210 is specially designed to receive position information from the GPS/IPS functionality 220, to receive image information and object classification information (corresponding to the image) from the computer vision and image classification function 230, and to pass this position and image and object classification information to the network search engine where the information is used to generate a query. Alternatively, the image information may not be sent to the retrieval function 210, in which case the search engine can return some number of location defined files having object image information that is compared (using the computer vision function 230) to the image information in the store 240. While the retrieval function 210 is shown as being separate from the search engine 205, this does not have to be the case, as it can alternatively be tightly integrated into the search engine function. The operation of the GPS function is well known and so will not be described in detail here other than to indicate that this functionality typically runs as a native application on the communication device and periodically determines the current position (geographic or indoor position) of the communication device.

The image acquisition and store function 240 can be a camera, image scanner, or any type of device that is capable of capturing a two-dimensional or three-dimensional image from the environment that is proximate to the communication device. The function acquisition function also operates to store images retrieved by the search engine 205. Regardless of what type of device is employed to acquire the images, these images have information that corresponds to some type of object, such as a work of art (i.e., painting, sculpture, tapestry, pottery, etc.), a human face, a building, a landscape feature, or any object for which image information can be captured in some manner. The image information maintained by the acquisition function is accessible by the computer vision and image classification function 230, and used by function 230 to detect or extract feature information from the image, determine which of the feature information to use during an object classification process, and then identifying an object class that most closely matches the image features. For example, after an image is captured, the function 130 can operate to identify edges, lines, areas of color and contrast, and other features associated with the captured image. Each of these features are represented as visual words, and an image feature histogram can be generated that is used to identify an object class. A determination that feature information in a histogram corresponds to an image class is typically a learned process. More specifically, a determination that an image belongs to an object class is based on a dictionary or code book comprising a plurality of image features, and each feature is described using visual words. An instance of a bag of visual words (BoW) can equate to an object class.

As described previously, the retrieval function 210 operates to receive position information, image information and object classification information, and to pass this information along to the search engine 205 which generates a search query having this information, and transmits the query over the network 130 to one or more servers, 110A, 110B or 110C, that the search engine has access to. The server or servers then operate on the information in the query to identify one or more location defined files corresponding to at least the location information, and alternatively to identify files corresponding to the location, and object type and visual image information in the query.

Figure 3:
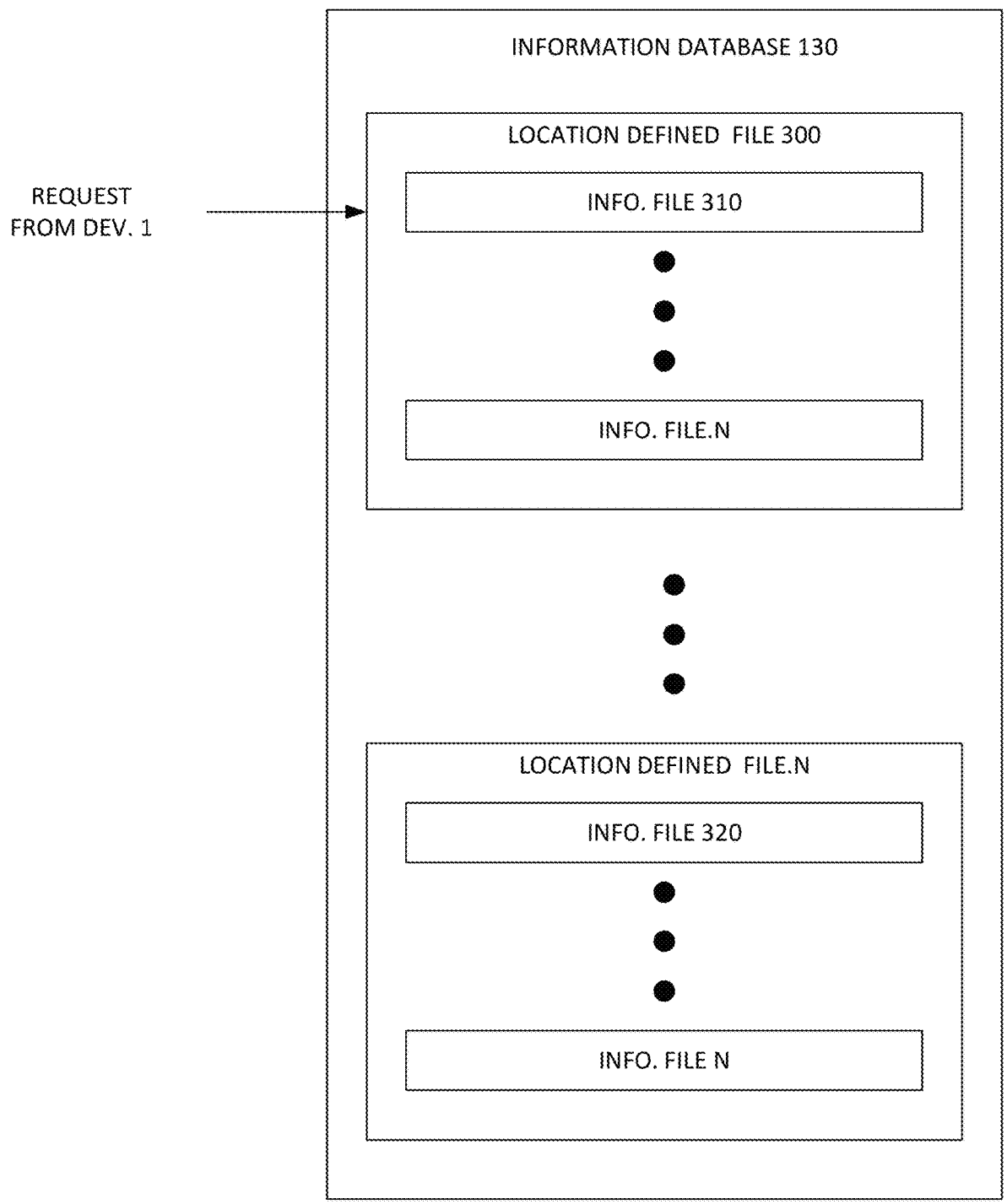
FIG. 3 is a diagram showing a plurality of location defined information files maintained in a storage means.

FIG. 3 is a diagram of any one of the information storage means 111A, 111B and 111C, showing a plurality of location defined files, files 300 to file.N (with N being an integer number), each one of which can have one or more sub-files (file 310 to file.N comprising file 300, and files 320 to file.N, with one or more of the sub-files having information corresponding to an object of interest. The information comprising each file can be metadata type information that is gleaned by a web crawler from web pages published on the network 130. This metadata can be comprised of object location information, information that is descriptive of the object and visual image information relating to the object, such as visual fingerprint information.

Figure 4:
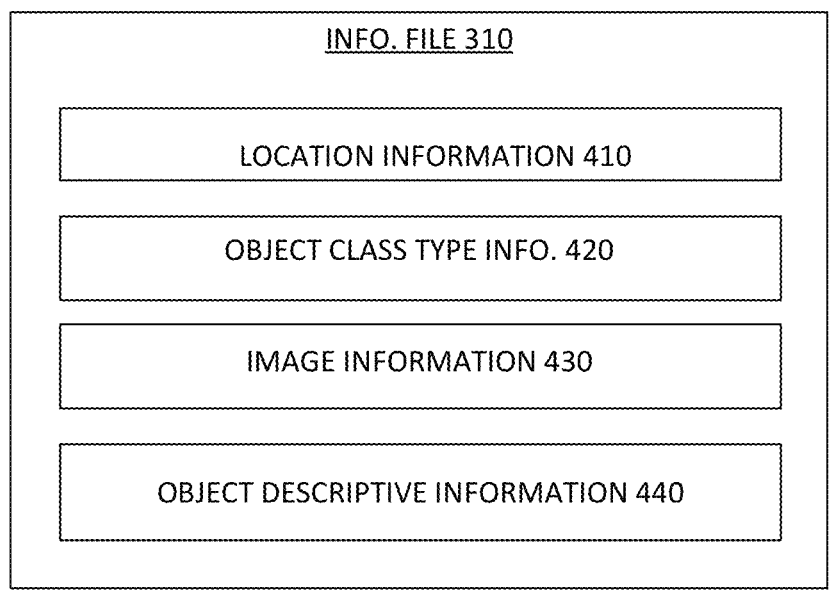
FIG. 4 is a diagram showing the organization of and information maintained in an instance of a location defined file.

FIG. 4 shows a format that can be used to store information in a location defined file, such as the file 310. This file is shown as being comprised of location information 410, object class type information 420, image information 430, and object information 440, but it should be understood that the file 310 can have other information as well. The location information can be a tag or an index that corresponds to a known, geographic location of an object for which information is being requested. Only files having a location tag that is the same as the location information in a query (whether the query location information is the current location of a user device or the query location is manually entered by a device user) will be identified by the search engine during a search. Limiting the scope of a search in this manner, greatly increases the probability that only information relating to an object of interest will be returned by the search engine, and reduces the time it takes to perform the search. The object classification information 420 can be a short descriptor of the type of object associated with the image. This descriptor can be, Picture, Sculpture, Building, Person Face, Landscape image, or any type of object class that can be described with a few words. This object classification information can also include sub-class information, such as the subject matter of a painting (i.e., Portrait Painting, Landscape Painting, Still Life Painting, etc.). The image information 430 can be any type of visual record of the image of interest. I can be a record having digitized pixel information, or it can be a fingerprint of the visual record against which the image in the query is compared.

The object information 440 in FIG. 4 is comprised of information that relates, in some manner, to the object identified as the result of the search. In the case that the object is a work or art, this information can be the name and biographical information about an artist that created the object, it can be descriptive information about the subject matter of the object, which in the case of a painting can be the geographic position corresponding to the subject matter comprising the painting (i.e., particular bridge over a particular body of water). The search query can be tailored by the device user so that all of the object information 440 associated with the object of interest is returned, or only a portion of this object information is returned by the search engine.

Typically, the web pages from which a web crawler extracts metadata to create the location defined files 310, are created by an organization that has some interest in disseminating information about an object, such as a work of art, that could lead to individuals attending a particular venue or activity. In this regard, these organizations (i.e., art museum, sporting event, concert event, etc.) can create a web page having the location information associated with their page that can be recognized and copied by a web crawler and entered into the information file 310 format in the form of a location tag. As described earlier, the information comprising a location tag can be geolocation information determined by a positioning service application or by a social networking application running on a device, or it can be location information that is manually entered into the device. In the later case, the location information does not need to be geolocation information, but can be street address information, ZIP code information, the name of a city, or any information that uniquely identifies a location of an object. The process by which the system 100 operates to process a search query and return results is now described with reference to FIG. 5.

FIG. 5 is a flow diagram showing a logical process by which the system 100 can operate to retrieve information corresponding to a particular object for an individual requesting the information. As previously described, a request for information about an object is generated in the form of a search query that may or may not include a visual image or object type information corresponding to the object of interest in the query. In the event that visual image and object type information is included in the query, the system 100 operates to only retrieve information in a location defined file that has matching image, location and object type information. Alternatively, in the case that a query is generated that does not have visual image and/or object type information, the system 100 can retrieve some number of the location defined files stored in association with the network servers that have location information that matches that in the search query. These location defined files can have image fingerprint information, or some other type of compressed or abridge image information that a computer vision application running on the requestor device can process to determine which of the files have matching image information, and then only information comprising these location defined files is displayed to be viewed on the user/requestor device. FIG. 5 describes the operation of the system 100 to process search queries having visual image and object type information and search queries not having visual image and/or object type information, and the system 100 can be configured to process either or both types of search queries.

Figure 5A:
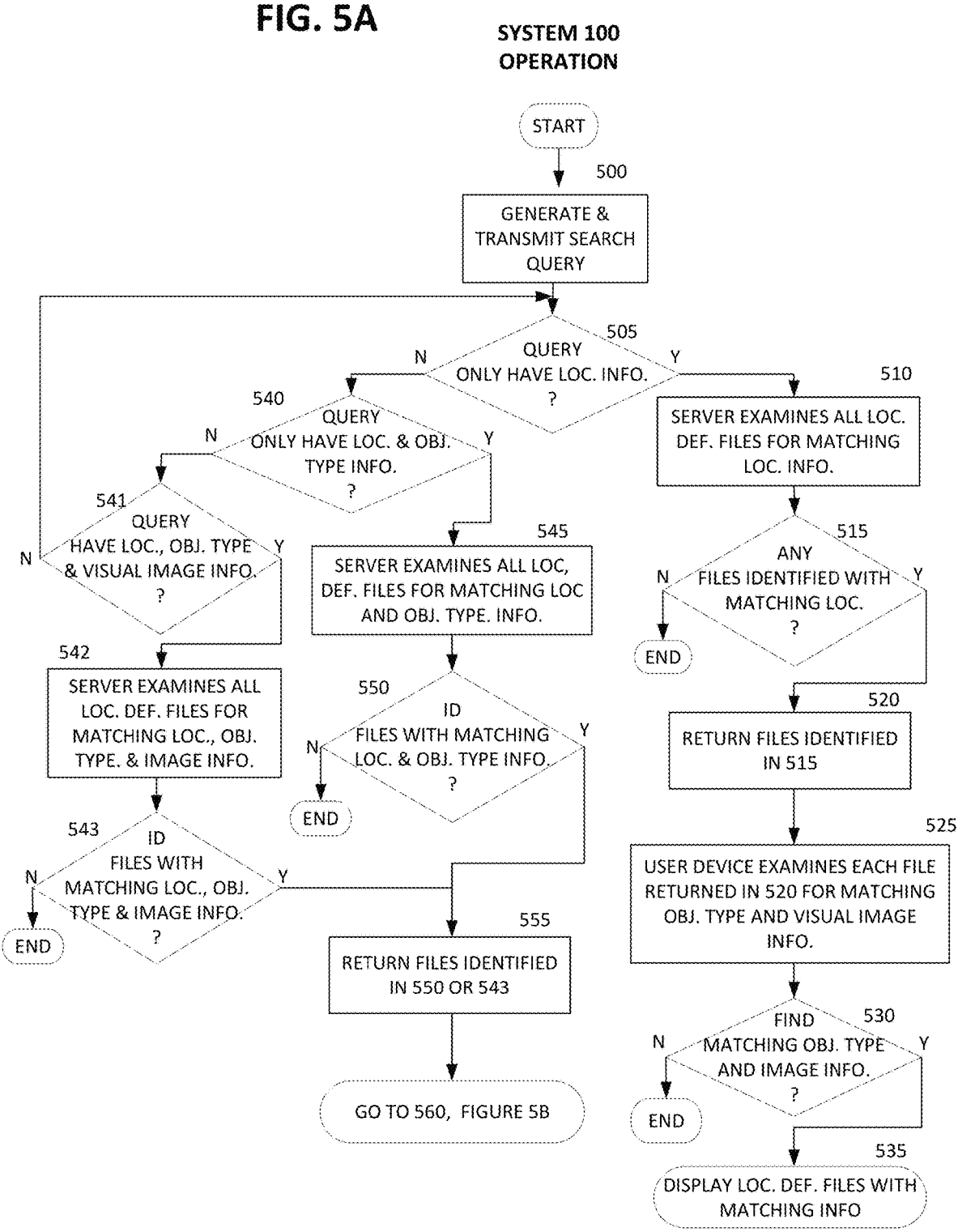
FIGS. 5A and 5B are diagrams showing a logical process for identifying and delivering information about an object located at a particular geolocation.

Referring now to FIG. 5A, after the system 100 is initialized, and subsequent to a user capturing or identifying a visual image about which they are interested to learn, the user at 500 interacts with the location based content retrieval function 210 running on their communication device t(i.e., device 101 or 105 in FIG. 1) to generate a search query. As described above, this search query can have object classification/type information, it may or may not have object location information, and it may or may not have visual image information in some format. The search engine uses the information in the query to find a location defined file having information that matches that in the query. At 505 one or more of the servers 110 receive the query and determine whether it only has location information or not. If only location information is included, then the process proceeds to 510, otherwise the process proceeds to 540. In the event that the query only has location information, then at 510 the server identifies all files having location information that is the same as the location information in the query. If at 515 the server identifies any location defined files having a location tag matching the location information in the query, then at 520 the server delivers these files to the use device, otherwise, the process terminates. At 525, computer vision and classification functionality 230 running on the user device operates to compare visual image information, selected by the user and stored on the user device, and to compare object type information relating to the selected visual image with visual image information in all of the location defined files returned in 520, and at 530, any matches can be displayed by the user device to be viewed by the user.

Returning to 505 in FIG. 5A, the process proceeds to 540 if the server determines that the query generated in 500 does not have only location information, and if at 540 the server determines that the query has only location and object type information, then at 545 the server examines all location defined files looking for location tag and object information that matches that information in the query. Alternatively, if at 540 the server determines that the query does not only have location and object type information, then the process proceeds to 541 where a determination is made that the query has location, object and visual image information or not, and if so the process proceeds to 542 where the server examines all the location defined files for matching information, and at 543 identifies all matching files, otherwise the process returns to 505. If at 550 and 543 the server identifies files with matching information matching the queries, then the server at 555 responds by sending the identified files to the user device, otherwise, the process terminates.

Figure 5B:
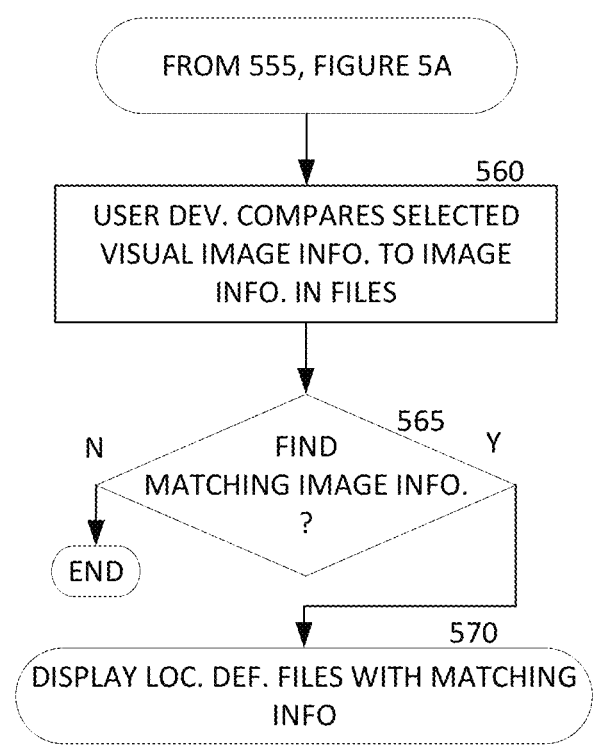

At 560 in FIG. 5B, the computer vision functionality running on the user device compares visual image information, relating to an object selected by the user, with visual image information in each one of the files identified at 550 and sent to the user device at 555, and if at 565 it is determined that matching information is found in any of the files, then at 570 at least some of the information comprising those files with matching information is displayed on the user device to be viewed.

I claim:

1. Method of identifying and delivering information corresponding to a work of art, comprising:

creating and maintaining a plurality of location defined computer files in association with a first computational device connected to a network, each of the location defined computer files having geographic position information corresponding to a location of a work of art, visual image information corresponding to the work of art, information corresponding to the work of art type, and having information that is descriptive of the work of art;

selecting by a user of a second computational device a visual image of a work of art stored on, or accessible over the network to, the second computational device, and entering the visual image of the work of art into a content retrieval application running on the second computational device, wherein the content retrieval application operates in conjunction with computer vision and image classification functionality to classify the selected visual image of the work of art as a work of art type and operates to receive geographic position information relating to the location of the work of art;

generating, by the content retrieval application, a request message comprising only the geographic position information relating to the work of art location and the work of art type, and sending the request message over the network to the first computational device;

the first computational device receiving the request message and using the geographic position information in the request message to identify at least two of the plurality of the location defined files maintained in association with it, and using the work of art type in the request message to identify at least one of the at least two identified location defined files, and responding to the request message by sending over the network to the second computational device at least some information, comprising the identified at least one location defined file, that is descriptive of the work of art; and receiving and displaying by the second computational device the information that is descriptive of the work of art.

2. The method of claim 1, further comprising the request message sent to the first computational device also having the visual image information selected by the user of the second computational device.

3. The method of claim 1, wherein the selected visual image comprises an image of the work of art captured from the environment that is proximate to the second computational device or is an image of the work of art copied from a web page of a network site.

4. The method of claim 3, wherein the environment comprises an indoor or an outdoor location.

5. The method of claim 1, wherein information descriptive of the work of art comprising the location defined computer files is any one or more of a name of a creator, creator title, description of the work of art, multimedia content relating to the work of art, price of the work of art, origin of the work of art, materials used to create the work of art, location associated with the work of art, and identification number of the work of art.

6. The method of claim 1, wherein the content retrieval application comprises computer vision functionality operating in cooperation with a network browser or search engine.

\* \* \* \* \*